(12) United States Patent
Kovac et al.

(10) Patent No.: US 9,296,054 B2
(45) Date of Patent: Mar. 29, 2016

(54) INDEXABLE CUTTING INSERT WITH A TRIANGULAR SHAPE

(71) Applicant: Kennametal Inc., Latrobe, PA (US)

(72) Inventors: Jeffrey Francis Kovac, Loyalhanna, PA (US); Jeremy Joseph Verellen, Jeannette, PA (US); Konrad Spitzenberger, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 260 days.

(21) Appl. No.: 13/900,646

(22) Filed: May 23, 2013

(65) Prior Publication Data

US 2014/0348599 A1 Nov. 27, 2014

(51) Int. Cl.
*B23C 5/20* (2006.01)
*B23B 27/16* (2006.01)

(52) U.S. Cl.
CPC ............. *B23C 5/207* (2013.01); *B23B 27/1611* (2013.01); *B23C 2200/0477* (2013.01); *B23C 2200/12* (2013.01); *B23C 2200/16* (2013.01); *B23C 2200/28* (2013.01); *B23C 2200/286* (2013.01); *B23C 2200/361* (2013.01); *B23C 2200/367* (2013.01); *B23C 2210/163* (2013.01); *Y10T 407/1924* (2015.01); *Y10T 407/23* (2015.01)

(58) Field of Classification Search
CPC ................... B23C 2200/286; B23C 2200/367; B23C 2210/163; B23C 5/207; B23C 2200/0477; B23C 2200/12
USPC ........................ 407/113, 33, 34, 42, 102–104
See application file for complete search history.

(56) References Cited

U.S. PATENT DOCUMENTS

| | | | | |
|---|---|---|---|---|
| 1,838,520 A | * | 12/1931 | Archer | ........................... 407/104 |
| 3,137,917 A | * | 6/1964 | Dowd | ................. B23B 27/1629 |
| | | | | 407/114 |
| 3,289,271 A | | 12/1966 | Stier | |
| 3,354,526 A | * | 11/1967 | Erkfritz | .................. B23C 5/2208 |
| | | | | 407/103 |
| 3,805,349 A | * | 4/1974 | Nose | ............................. 407/114 |
| 4,461,602 A | * | 7/1984 | Zettl | ..................... B23C 5/2213 |
| | | | | 407/40 |
| 6,508,150 B1 | * | 1/2003 | Bertschinger | ................... 82/1.11 |
| 6,872,034 B2 | | 3/2005 | Satran et al. | |
| 6,935,814 B2 | * | 8/2005 | Nagaya et al. | ................ 407/100 |
| 7,094,007 B2 | | 8/2006 | Satran et al. | |
| 7,104,735 B2 | | 9/2006 | Johnson et al. | |
| 7,455,483 B2 | * | 11/2008 | Koskinen | ................. B23B 27/16 |
| | | | | 407/113 |
| 7,494,303 B2 | | 2/2009 | Koskinen | |
| 7,901,161 B2 | * | 3/2011 | Jansson | .......................... 407/113 |
| 8,202,026 B2 | * | 6/2012 | Satran et al. | .................. 407/113 |

(Continued)

FOREIGN PATENT DOCUMENTS

DE 102011056422 A1 * 6/2013 ............ B23C 5/2213

*Primary Examiner* — Sunil K Singh
*Assistant Examiner* — Sara Addisu
(74) *Attorney, Agent, or Firm* — Larry R. Meenan (57) ABSTRACT

An indexable cutting insert having a triangular shape includes three sides and three cutting corners. A first planar surface and a second, parallel planar surface connects the three sides. In one embodiment, three major cutting edges are formed at an intersection between a respective side and the first planar surface. In another aspect, six major cutting edges are formed at an intersection between a respective side and the planar surfaces. In another aspect six major right-handed cutting edges and six major left-handed cutting edges are formed at an intersection between the sides and the first and second planar surfaces.

18 Claims, 10 Drawing Sheets

(56) References Cited

U.S. PATENT DOCUMENTS

| | | | |
|---|---|---|---|
| 9,144,851 B2* | 9/2015 | Bhagath | B23C 5/08 |
| 2002/0031410 A1* | 3/2002 | Isaksson | 407/114 |
| 2008/0226403 A1 | 9/2008 | Craig | |
| 2010/0266353 A1* | 10/2010 | Zitzlaff | B23B 27/145 |
| | | | 407/113 |
| 2011/0020080 A1* | 1/2011 | Zettler | B23C 5/06 |
| | | | 407/113 |
| 2011/0299946 A1* | 12/2011 | Hecht | 407/42 |
| 2012/0201622 A1* | 8/2012 | Kocherovsky | B23B 29/02 |
| | | | 409/131 |
| 2013/0094913 A1* | 4/2013 | Yoshida | B23C 5/06 |
| | | | 407/42 |
| 2013/0108387 A1* | 5/2013 | Ishi et al. | 409/132 |
| 2013/0129433 A1* | 5/2013 | Matsumoto et al. | 407/51 |
| 2013/0129434 A1* | 5/2013 | Bhagath | 407/51 |
| 2013/0142578 A1* | 6/2013 | Shinjo | B23C 5/207 |
| | | | 407/70 |
| 2013/0183110 A1* | 7/2013 | Schaefer | B23B 27/08 |
| | | | 407/102 |
| 2013/0251464 A1* | 9/2013 | Hecht | B23C 5/06 |
| | | | 407/48 |
| 2014/0041495 A1* | 2/2014 | Koga | B23C 5/06 |
| | | | 83/13 |
| 2014/0186130 A1* | 7/2014 | Hecht | B23B 27/007 |
| | | | 407/100 |

* cited by examiner

INDEXABLE CUTTING INSERT WITH A TRIANGULAR SHAPE

BACKGROUND OF THE INVENTION

The invention relates in general to a cutting insert that may be detachably mounted on a tool holder for cutting a workpiece, and in particular to a triangular-shaped, multi-edge, indexable cutting insert for milling a ninety degree shoulder in the workpiece.

Cutting inserts having a triangular shape are generally known. However, conventional triangular cutting inserts are limited by the number of cutting edges. The number of cutting edges is directly related to the cost of the cutting insert. The more cutting edges that are available, the less the cutting insert will cost. In addition, a triangular shaped cutting insert provides the most cost effective shape for machining a ninety degree shoulder in the workpiece. Thus, it is desirable to provide an indexable triangular shaped cutting insert having multiple cutting edges and having the ability to produce a ninety degree shoulder in the workpiece.

SUMMARY OF THE INVENTION

In one aspect of the invention, an indexable cutting insert having a triangular shape comprises three sides and three cutting corners at intersections of the sides, the three cutting corners formed with a nose radius; a first planar surface connecting the three sides and a second planar surface parallel to the first surface and also connecting the three sides, one of the first and second planar surfaces acting as a seating surface when the cutting insert is mounted in an insert seat of a milling body; a mounting hole located centrally in the cutting insert, the mounting hole penetrating both the first and second planar surfaces and having a central axis; and three major cutting edges formed at an intersection between a respective side and the first planar surface and extending an entire length, L, of the respective side.

In another aspect of the invention, an indexable cutting insert having a triangular shape comprises three sides and six cutting corners at intersections of the sides, each cutting corner formed with a chamfer; a first planar surface connecting the three sides and a second planar surface parallel to the first surface and also connecting the three sides, wherein both of the first and second planar surfaces act as a seating surface when the cutting insert is mounted in an insert seat of a milling body; a mounting hole located centrally in the cutting insert, the mounting hole penetrating both the first and second planar surfaces and having a central axis; and six major right-handed cutting edges and six major left-handed cutting edges formed at an intersection between a respective side and the first and second planar surfaces, wherein each of the major right-handed cutting edges and each of the major left-handed cutting edges extend from a respective cutting corner toward another cutting corner for approximately one-half the length, L, of the respective side.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
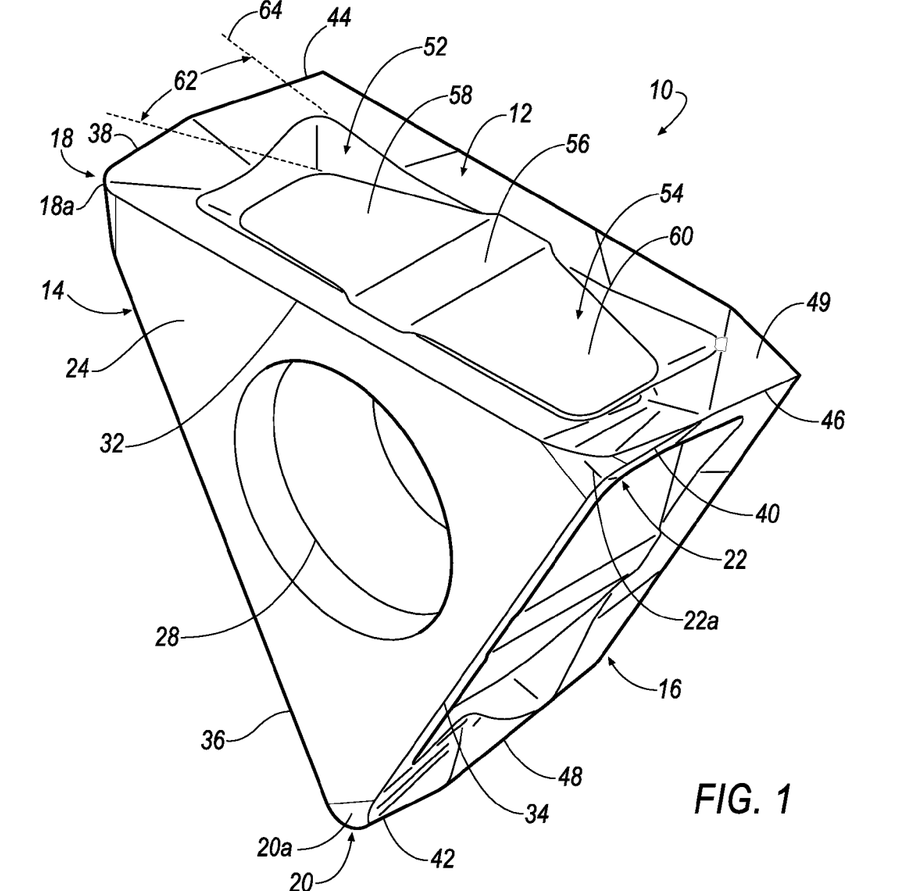
FIG. 1 shows a perspective view of a cutting insert according to an embodiment of the invention.
Figure 2:
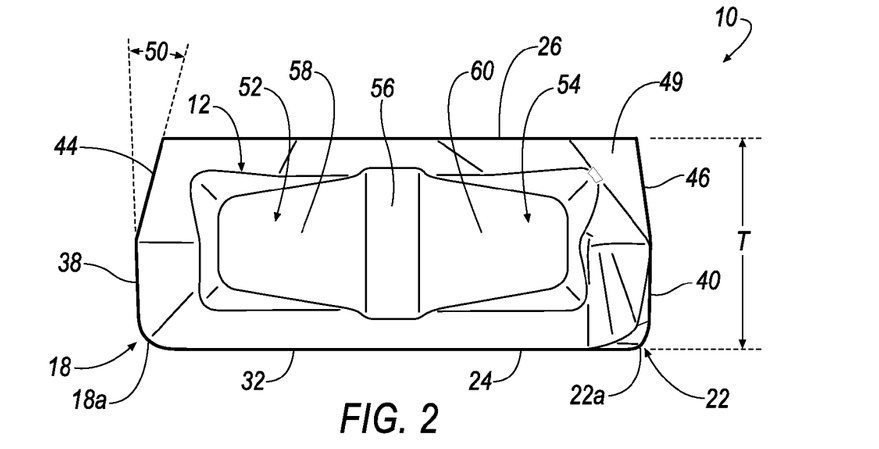
FIG. 2 shows a side view of the cutting insert of FIG. 1.
Figure 3:
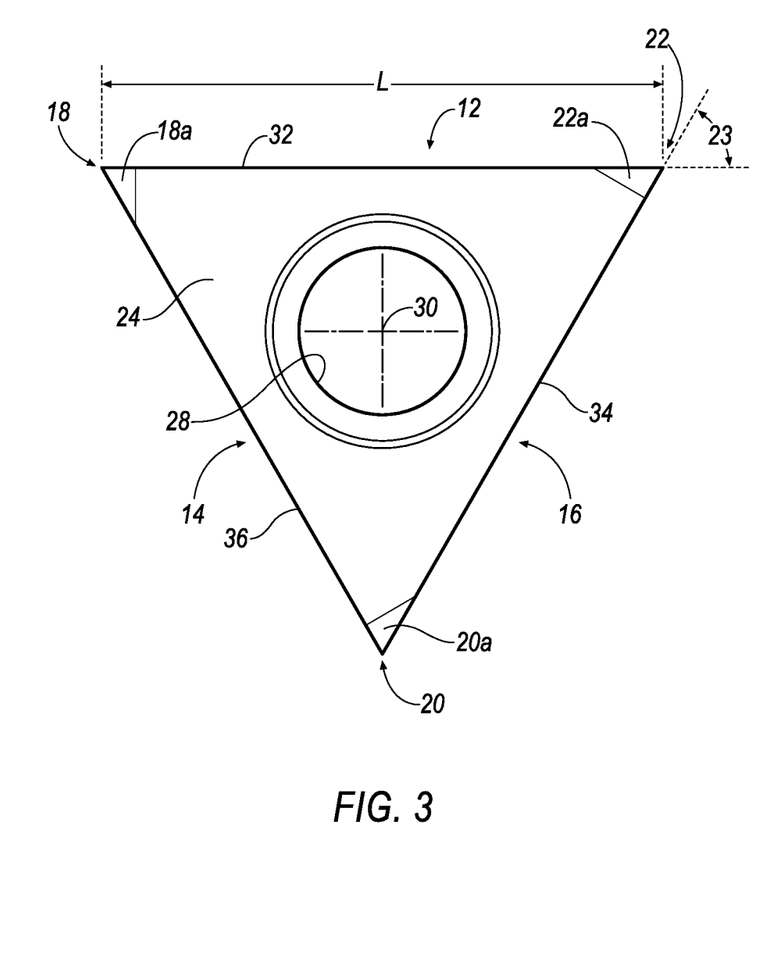
FIG. 3 shows a planar view of the cutting insert of FIG. 1.

Referring now to FIGS. 1-4, a cutting insert 10 is shown according to an embodiment of the invention. As shown in FIG. 3, the cutting insert 10 has a generally triangular shape in planar view. The cutting insert 10 has three sides 12, 14 and 16 and three cutting corners 18, 20 and 22 at intersections of the sides 12, 14 and 16. The three cutting corners 18, 20, 22 are formed with a nose radius 18a, 20a, 22a. Each side 12, 14 and 16 has approximately the same length, L, and mutually form an angle 23 of about sixty (60) degrees with respect to each other, i.e., a corresponding angle of an equilateral triangle, as shown in FIG. 3. The cutting insert 10 also includes a first planar surface 24, which connects to the three sides 12, 14 and 16 of the cutting insert 10. Correspondingly, the cutting insert 10 has a second planar surface 26, which is generally parallel with the first surface 24, which also connects to the three sides 12, 14 and 16 and acts as a seating surface when the cutting insert 10 is mounted in an insert seat of a milling body. The first and second planar surfaces 24, 26 have essentially the shape of an equilateral triangle, as shown in FIG. 3.

For mounting the cutting insert 10 in an insert seat of a milling body, the cutting insert 10 is provided with a mounting hole 28, which is located centrally in the cutting insert 10. The mounting hole 28 penetrates both the first and second planar surfaces 24, 26 and has a central axis 30.

The cutting insert 10 in this embodiment has three (3) major cutting edges 32, 34, 36, three (3) minor cutting edges, 38, 40, 42, and three (3) ramp cutting edges 44, 46, 48. The three major cutting edges 32, 34, 36 are formed at the intersection between a respective side 12, 14, 16 and the first planar surface 24 and extend substantially the entire length, L, of the respective side 12, 14, 16, i.e., from one cutting corner 18, 20, 22 to another cutting corner 18, 20, 22. For example, the major cutting edge 32 extends substantially the entire length, L, from the cutting corner 18 to the cutting corner 22, as shown in FIG. 3.

As shown in FIGS. 1 and 2, the minor cutting edges 38, 40, 42 are formed at the intersection between one side 12, 14, 16 and an adjacent side 12, 14, 16. The minor cutting edges 38, 40, 42 are formed approximately perpendicular to the major cutting edges 32, 34, 36. In the illustrated embodiment, each minor cutting edge 38, 40, 42 extends from a respective cutting corner 18, 20, 22 toward the second surface 26 for approximately one-half the thickness, T, of the cutting insert 10. However, it will be appreciated that the invention is not limited by the length of the minor cutting edges 38, 40, 42, and that the invention can be practiced with minor cutting edges having any desirable length with respect to the thickness, T, of the cutting insert 10. For example, in an alternative embodiment, the minor cutting edges 38, 40, 42 can extend the entire thickness, T, of the cutting insert. In this alternative embodiment, the minor cutting edges 38, 40, 42 would provide a wiping action for semi-finishing applications.

Figure 4:
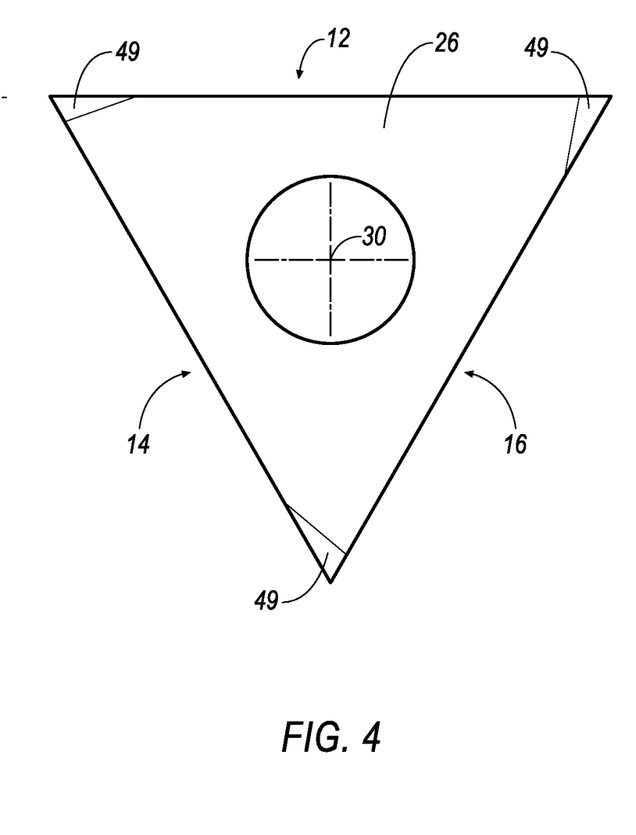
FIG. 4 shows another planar view of the cutting insert of FIG. 1.

Ramp cutting edges 44, 46, 48 are also formed at the intersection between one side 12, 14, 16 and an adjacent side 12, 14, 16. Specifically, each ramp cutting edge 44, 46, 48 is formed by an angled chamfer 49 formed in a respective side 12, 14, 16 that extends from the second planar surface 26, as shown in FIG. 4. For example, the ramp cutting edge 46 is formed by the angled chamfer 49 in the side 12, as shown in FIGS. 1 and 2. Each ramp cutting edge 44, 46, 48 extends from a respective minor cutting edge 38, 40, 42 to the second surface 26 for approximately one-half the thickness, T, of the cutting insert 10 to the second surface 26. However, it will be appreciated that the invention is not limited by the length of the ramp cutting edges 44, 46, 48, and that the invention can be practiced with ramp cutting edges having a length in a range between about one-quarter to about three-quarters the thickness, T, of the cutting insert 10. The ramp cutting edges 44, 46, 48 are formed at an angle 50 with respect to the minor cutting edges 38, 40, 42, as shown in FIG. 2. The angle 50 can be in a range between about five (5) degrees to about thirty-five (35) degrees. In the alternative embodiment in which the minor cutting edges 38, 40, 42 extend the entire thickness, T, of the cutting insert 10, the ramp cutting edges 44, 46, 48 would not exist.

In the illustrated embodiment, each side 12, 14, 16 includes a pair of recesses 52, 54 separated by a substantially planar connection portion 56. The recesses 52, 54 are countersunk in relation to the cutting edges and give the cutting edges a positive rake angle in order to easily cut in a piece to be machined. Each recess 52, 54 has a width of about one-half of the thickness, T, of the cutting insert 10. Each recess 52, 54 has a substantially planar seating surface 58, 60. Thus, each side 12, 14, 16 of the cutting insert 10 has two (2) seating surfaces 58, 60. The seating surfaces 58, 60 are formed at an angle 62 with respect a plane 64 parallel to the connection portion 56 (and also parallel to the major cutting edges 32, 34, 36). The angle 62 can be between about five (5) degrees and about thirty-five (35) degrees. In addition, the seating surfaces 58, 60 are substantially perpendicular to the first and second planar surfaces 24, 26.

Figure 5:
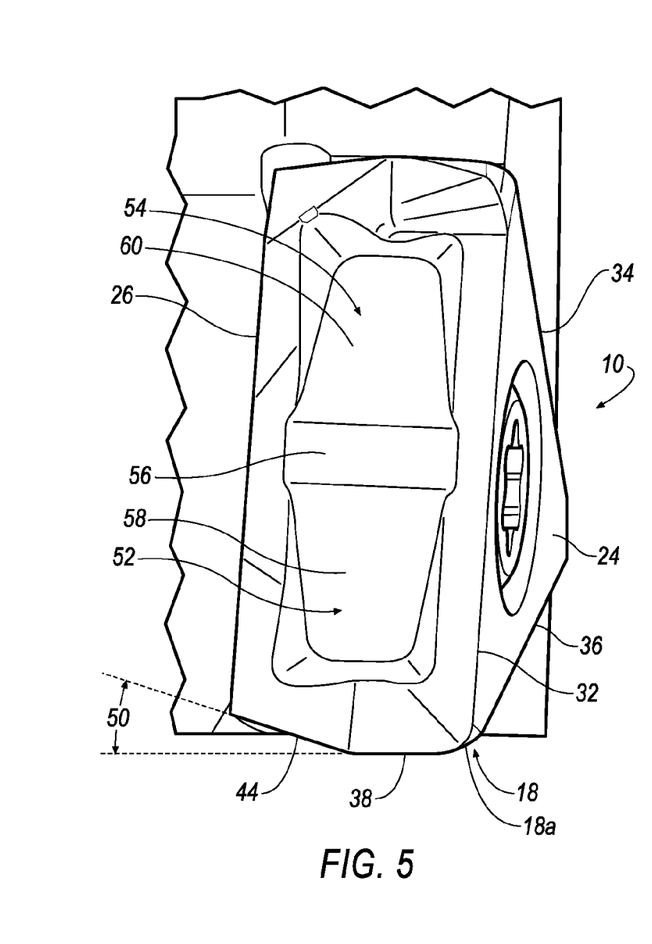
FIG. 5 is a perspective view of the cutting insert of FIG. 1 when mounted in a cutting tool.
Figure 6:
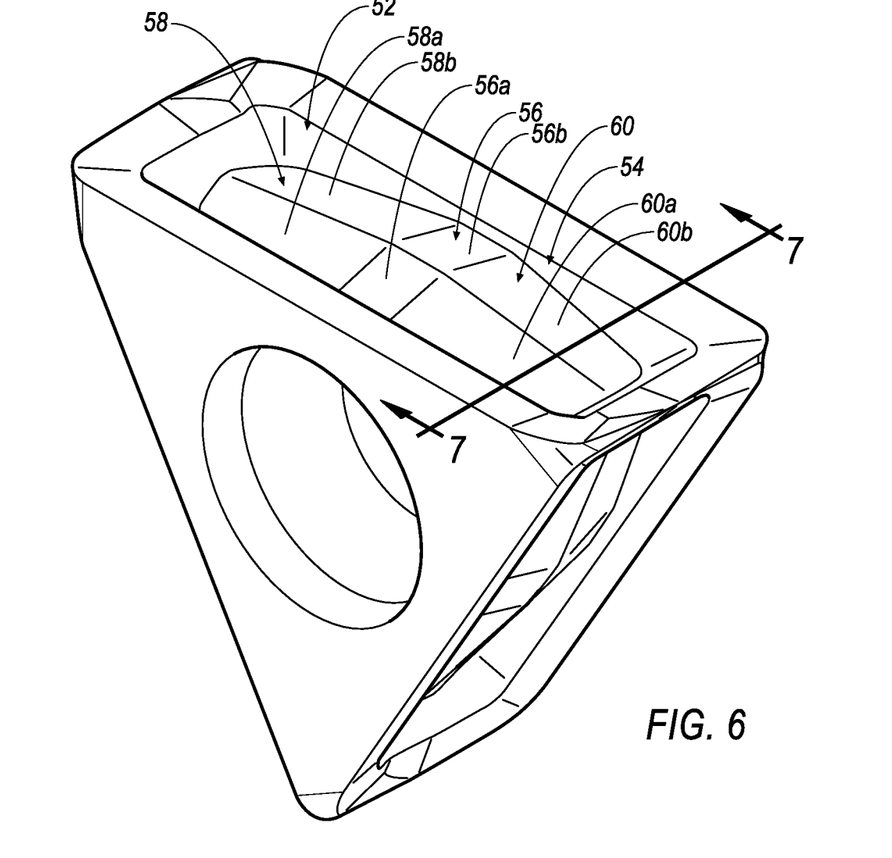
FIG. 6 shows a perspective view of a cutting insert with V-shaped seating surfaces according to an alternative embodiment of the invention.
Figure 7:
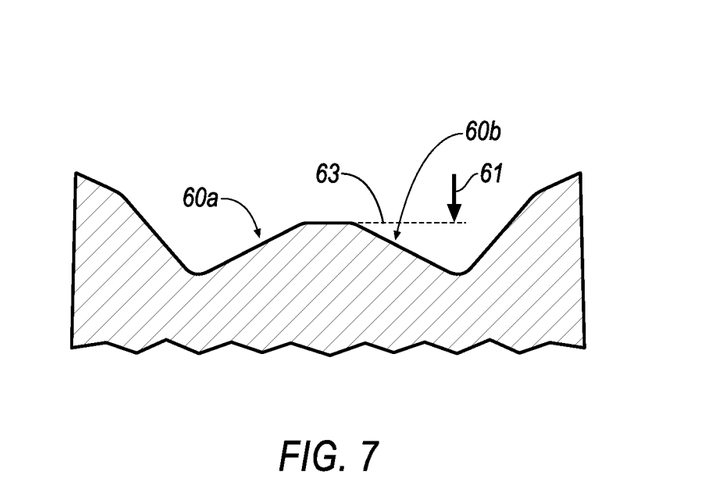
FIG. 7 is a cross-sectional view taken along line 7-7 of FIG. 6.

FIG. 5 shows the cutting insert 10 in a mounted position of a cutting tool. The second surface 26 and the two seating surfaces 58, 60 are used to provide three-point contact when the cutting insert 10 is in the mounted position. As shown in FIG. 5, the minor cutting edge 38 is positioned on a higher elevation with respect to the workpiece than the ramp cutting edge 44. This difference in elevation is attributed to the ramp cutting edge 44 being formed at the angle 50 with respect to the minor cutting edge 38. During a milling cutting operation, the major cutting edge 32 and the minor cutting edge 38 are the active cutting edges, while the ramp cutting edge 44 is inactive. The major cutting edge 32 and the minor cutting edge 38 are capable of producing a ninety (90) shoulder cut in the workpiece 172. In addition, the cutting insert 10 is capable of performing a ramp cutting operation. During a ramp cutting operation, the ramp cutting edge 44 is also an active cutting edge. In an alternative embodiment, the pair of recesses 52, 54 are not separated by a substantially planar connection portion 56, and the connection portion 56 and each of the seating surfaces 58, 60 are substantially V-shaped, as shown in FIGS. 6 and 7. In this alternative embodiment, the connection portion 56 and each seating surface 58, 60 comprise a pair of angled surfaces 56a, 56b, 58a, 58b, 60a, 60b, respectively, that are formed at an angle 61 of between about ten (10) degrees and about twenty (20) degrees with respect to a plane 63 that is substantially perpendicular to the first and second planar surfaces 24, 26. In one embodiment, the angle 61 can be about fifteen (15) degrees.

Figure 8:
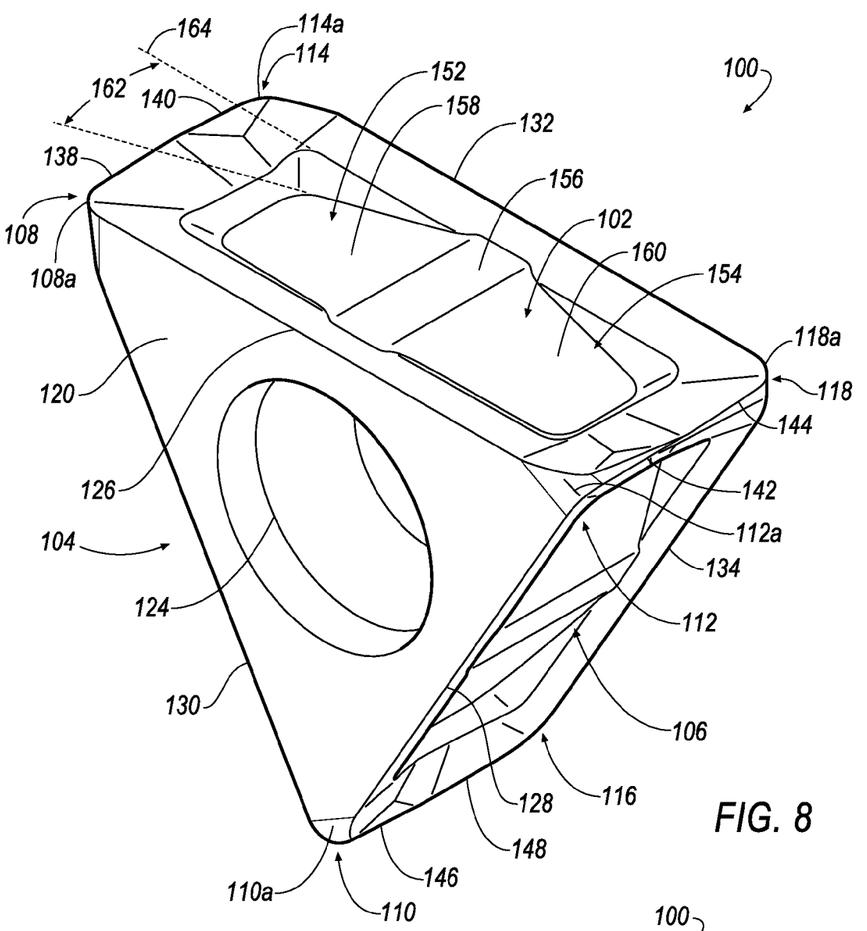
FIG. 8 shows a perspective view of a cutting insert according to another embodiment of the invention.
Figure 9:
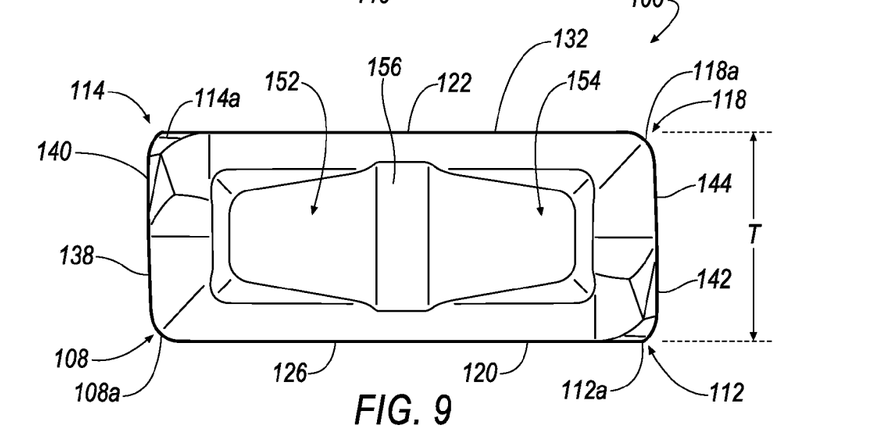
FIG. 9 shows a side view of the cutting insert of FIG. 8.
Figure 10:
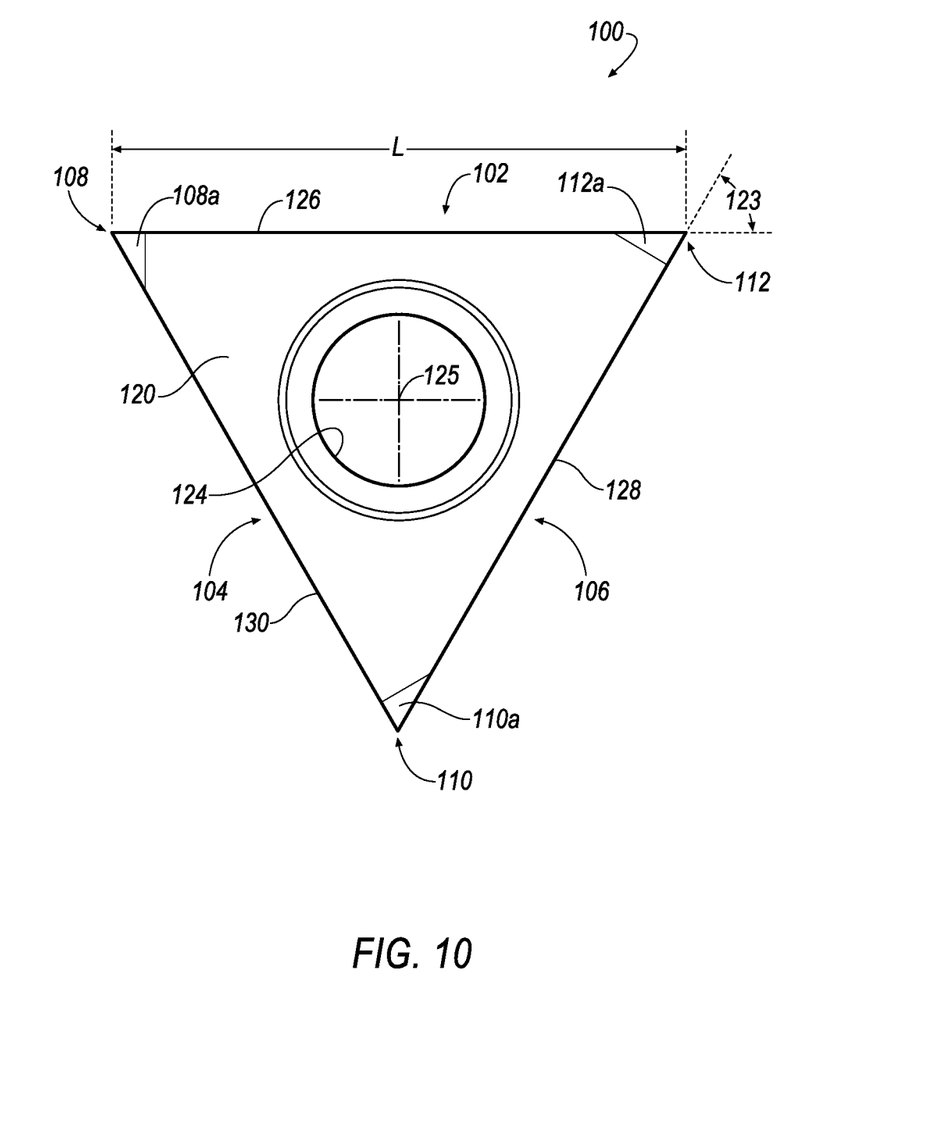
FIG. 10 shows a planar view of the cutting insert of FIG. 8.

Referring now to FIGS. 8-11, a cutting insert 100 is shown according to another embodiment of the invention. Similar to the cutting insert 10, the cutting insert 100 has a generally triangular shape in planar view, as shown in FIG. 10. The cutting insert 100 has three sides 102, 104 and 106 and six (6) cutting corners 108, 110, 112, 114, 116 and 118 at intersections of the sides 102, 104 and 106. Each cutting corner 108, 110, 112, 114, 116 and 118 is formed with a nose radius 108a, 110a, 112a, 114a, 116a, 118a, respectively. Similar to the cutting insert 10, each side 102, 104 and 106 has approximately the same length, L, and mutually form an angle 123 of about sixty (60) degrees with respect to each other, i.e., a corresponding angle of an equilateral triangle, as shown in FIG. 10. The cutting insert 100 also includes a first planar surface 120, which connects to the three sides 102, 104 and 106 of the cutting insert 100 and acts as a seating surface when the cutting insert 100 is mounted in a milling body. Similarly, the cutting insert 100 has a second planar surface 122, which is generally parallel with the first seating surface 120, and also connects to the three sides 102, 104 and 106 of the cutting insert 100 and also acts as a seating surface when the cutting insert 100 is mounted in the milling body. Similar to the cutting insert 10, the first and second planar surfaces 120, 122 have essentially the shape of an equilateral triangle, as shown in FIG. 10.

For mounting the cutting insert 100 in an insert seat of the milling body, the cutting insert 100 is provided with a mounting hole 124, which is located centrally in the cutting insert 100. The mounting hole 124 penetrates both the first planar surface 120 and the second planar surface 122. Similar to the cutting insert 10, the mounting hole 124 has a central axis 125, as shown in FIG. 10.

The cutting insert 100 in this embodiment has six (6) major cutting edges 126, 128, 130, 132, 134, 136 (major cutting edge 136 is not shown in FIG. 8, but is opposite cutting edge 130), and six (6) minor cutting edges 138, 140, 142, 144, 146, 148. The six major cutting edges 126, 128, 130, 132, 134, 136 are formed at the intersection between the sides 102, 104, 106 and the first and second planar surfaces 120, 122 and extend substantially the entire length, L, of the sides 102, 104, 106, i.e., from cutting corner 108, 110, 112, 114, 116, 118 to another cutting corner 108, 110, 112, 114, 116, 118. For example, the major cutting edge 126 extends substantially the entire length, L, from the cutting corner 108 to the cutting corner 112, as shown in FIG. 10.

The minor cutting edges 138, 140, 142, 144, 146, 148 are formed at the intersection between one side 102, 104, 106 and an adjacent side 102, 104, 106. Each minor cutting edge 138, 140, 142, 144, 146, 148 extends from a respective cutting corner 108, 110, 112, 114, 116, 118 for approximately one-half the thickness, T, of the cutting insert 10. The minor cutting edges 138, 140, 142, 144, 146, 148 are formed approximately perpendicular to the major cutting edges 126, 128, 130, 132, 134, 136. For example, the minor cutting edge 138 extends from the cutting corner 118 for approximately one-half the thickness, T, of the cutting insert 10 and is substantially perpendicular to the major cutting edge 126, as shown in FIGS. 8 and 9.

Each side 102, 104, 106 includes a pair of recesses 152, 154 separated by a substantially planar connection portion 156. The recesses 152, 154 are countersunk in relation to the cutting edges and give the cutting edges a positive rake angle in order to easily cut in a piece to be machined. Each recess 152, 154 has a width of about one-half of the thickness, T, of the cutting insert 100. Each recess 152, 154 has a substantially planar seating surface 158, 160. Thus, the cutting insert 100 has a total of six (6) seating surfaces 158, 160, i.e. two (2) seating surfaces 158, 160 for each side 102, 104, 106. The seating surfaces 158, 160 are formed at an angle 162 with respect a plane 164 parallel to the connection portion 156 (and also parallel to the major cutting edges 126, 128, 130, 132, 134, 136). The angle 162 can be between about five (5) degrees and about thirty-five (35) degrees.

Figure 11:
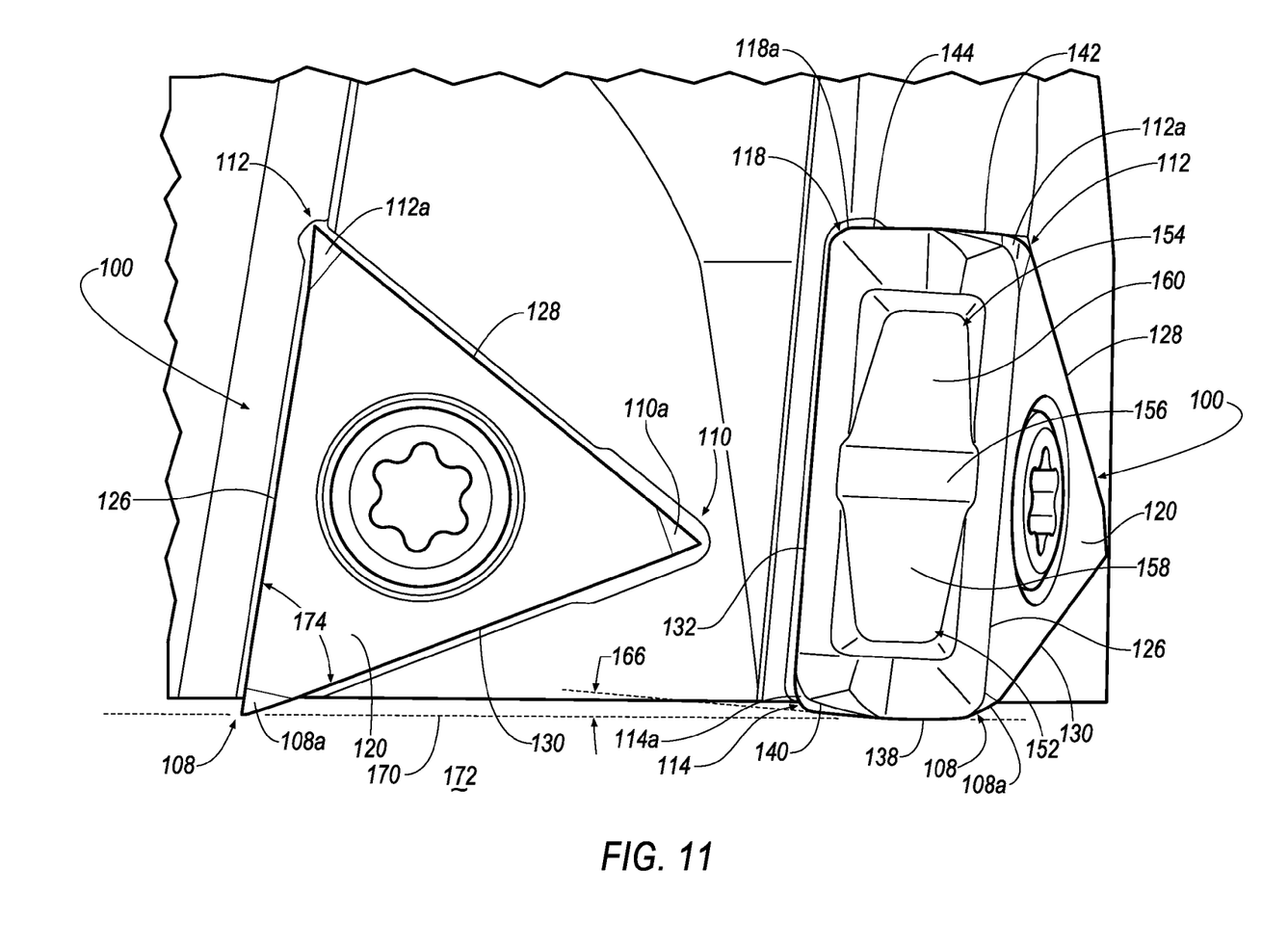
FIG. 11 is a perspective view of the cutting insert of FIG. 8 when mounted in the cutting tool.
Figure 12:
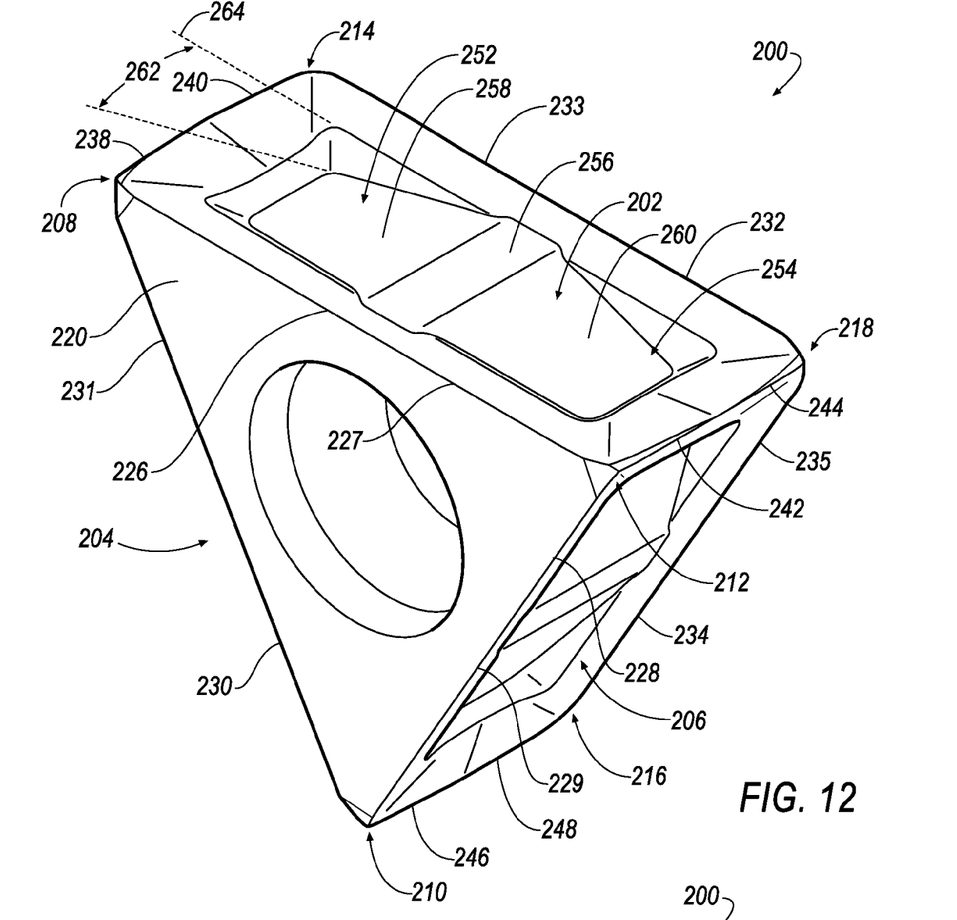
FIG. 12 shows a perspective view of a cutting insert according to another embodiment of the invention.

FIG. 11 shows the cutting insert 100 in a mounted position of a cutting tool. One of the first and second planar surfaces 120, 122 and the two seating surfaces 158, 160 are used to provide three-point contact when the cutting insert 100 is in the mounted position. In FIG. 11, the minor cutting edge 138 is essentially situated in the plane of the paper, while the adjacent minor cutting edge 140 extends transversely to the plane of the paper. The nose radius 114a being formed at the cutting corner 114 results in the minor cutting edge 140 being situated at a clearance angle 166 of about 3.0 degrees to about 3.5 degrees between the inactive minor cutting edge 140 and the surface 170 of the workpiece 172. Thus, the major cutting edge 130 and the minor cutting edge 138 are the active cutting edges, while the adjacent minor cutting edge 140 is inactive because of the clearance angle 166. The major cutting edge 130 and the minor cutting edge 140 are capable of producing a ninety (90) shoulder cut in the workpiece 172.

Figure 13:
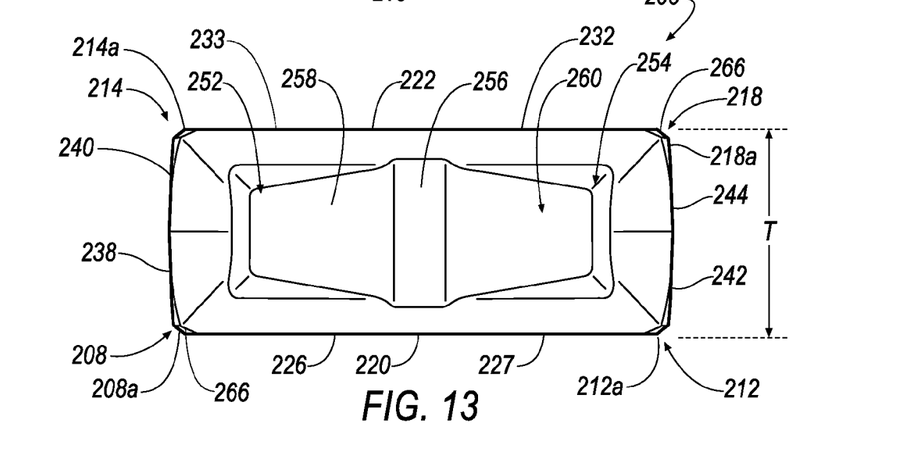
FIG. 13 shows a side view of the cutting insert of FIG. 12.
Figure 14:
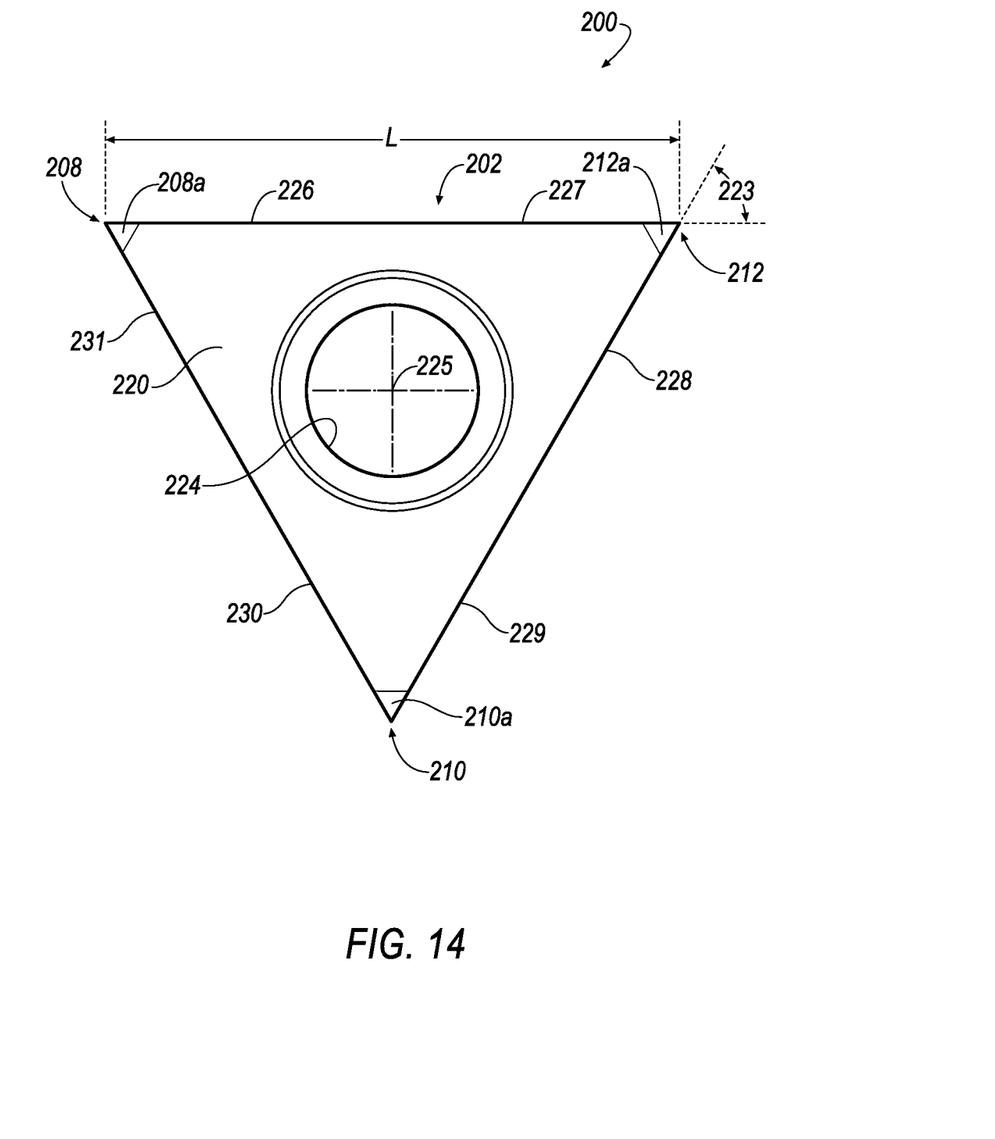
FIG. 14 shows a planar view of the cutting insert of FIG. 12.

Referring now to FIGS. 12-15, a cutting insert 200 is shown according to another embodiment of the invention. Similar to the cutting inserts 10, 100, the cutting insert 200 has a generally triangular shape in planar view, as shown in FIG. 14. The cutting insert 200 has three sides 202, 204 and 206 and six cutting corners 208, 210, 212, 214, 216 and 218 at intersections of the sides 202, 204 and 206. The six cutting corners 208, 210, 212, 214, 216 and 218 are formed with an angled chamfer 208a, 210a, 212a, 214a, 216a, 218a, respectively. Similar to the cutting inserts 10, 100, each side 202, 204 and 206 has approximately the same length, L, and mutually form an angle 223 of about sixty (60) degrees with respect to each other, i.e., a corresponding angle of an equilateral triangle, as shown in FIG. 14. The cutting insert 200 also includes a first planar surface 220, which connects to the three sides 202, 204 and 206 of the cutting insert 200 and acts as a seating surface when the cutting insert 200 is mounted in a milling body. Similarly, the cutting insert 200 has a second planar surface 222, which is generally parallel with the first seating surface 220, and also connects to the three sides 202, 204 and 206 of the cutting insert 200 and acts as a seating surface when the cutting insert 200 is mounted in the milling body. Similar to the cutting inserts 10, 200, the first and second planar surfaces 220, 222 have essentially the shape of an equilateral triangle, as shown in FIG. 14.

For mounting the cutting insert 200 in an insert seat of the milling body, the cutting insert 200 is provided with a mounting hole 224, which is located centrally in the cutting insert 200. The mounting hole 224 penetrates both the first and second planar surfaces 220, 222 and has a central axis 225, as shown in FIG. 14.

In this embodiment, the cutting insert 200 has six (6) major right-handed cutting edges 226, 228, 230, 232, 234, 236 (major cutting edge 236 is not shown in FIG. 9, but is opposite cutting edge 230), six (6) major left-handed cutting edges 227, 229, 231, 233, 235, 237 (cutting edge 237 is not shown in FIG. 9, but is opposite cutting edge 231), and six (6) minor cutting edges 238, 240, 242, 244, 246, 148. Thus, the cutting insert 200 has a total of twelve (12) major cutting edges (i.e., six (6) right-handed cutting edges 226, 228, 230, 232, 234, 236 and six (6) left-handed cutting edges 227, 229, 231, 233, 235, 237). The six (6) major right-handed cutting edges 226, 228, 230, 232, 234, 236 and the six (6) major left-handed cutting edges 227, 229, 231, 233, 235, 237 are formed at the intersection between the sides 202, 204, 206 and the planar surfaces 220, 222. Unlike the cutting inserts 10, 100, each of the major right-handed and the major left-handed cutting edges of the cutting insert 200 extend from one cutting corner toward the another cutting corner for approximately one-half the length, L, of the sides 202, 204, 206. For example, the major right-handed cutting edge 226 extends from the cutting corner 208 toward the cutting corner 212 for about one-half the length, L, of the side 202, while the major left-handed cutting edge 227 extends from the cutting corner 212 toward the cutting corner 208 for about one-half the length, L, of the side 202. It is noted that the major right-handed cutting edge 226 and the major left-handed cutting edge 227 together extends substantially the entire length, L, of the side 202. In an alternative embodiment, the major cutting edges would extend the entire length, L, of the sides 202, 204, 206. In this alternative embodiment, the cutting insert 200 would have six (6) major right handed cutting edges or six (6) major left handed cutting edges.

The minor cutting edges 238, 240, 242, 244, 246, 248 are formed at the intersection between one side 202, 204, 206 and an adjacent side 202, 204, 206. Each minor cutting edge 238, 240, 242, 244, 246, 248 extends from a respective cutting corner 208, 210, 212, 214, 216, 218 for approximately one-half the thickness, T, of the cutting insert 10. The minor cutting edges 238, 240, 242, 244, 246, 248 are formed approximately perpendicular to the major cutting edges, as shown in FIG. 13.

Each side 202, 204, 206 includes a pair of recesses 252, 254 separated by a substantially planar connection portion 256. The recesses 252, 254 are countersunk in relation to the cutting edges and give the cutting edges a positive rake angle in order to easily cut in a piece to be machined. Each recess 252, 254 has a width of about one-half of the thickness, T, of the cutting insert 200. Each recess 252, 254 has a substantially planar seating surface 258, 260. Thus, the cutting insert 200 has a total of six (6) seating surfaces 258, 260, i.e. two (2) seating surfaces 258, 260 for each side 202, 204, 206. The seating surfaces 258, 260 are formed at an angle 262 with respect a plane 264 parallel to the connection portion 256 (and also parallel to the major cutting edges). The angle 262 can be between about five (5) degrees and about thirty-five (35) degrees.

Figure 15:
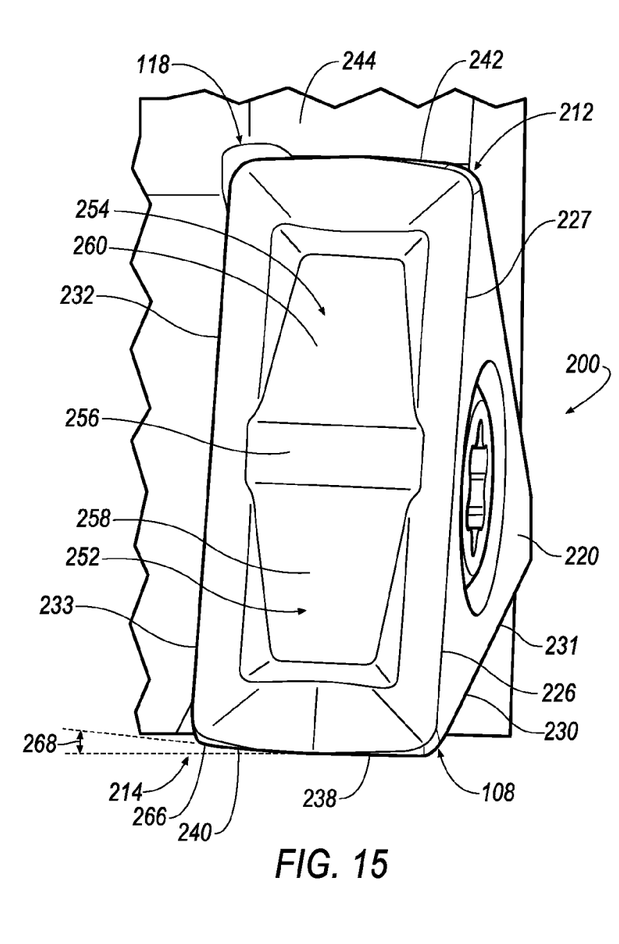
FIG. 15 is a perspective view of the cutting insert of FIG. 12 when mounted in the cutting tool.

FIG. 15 shows the cutting insert 200 in a mounted position of a cutting tool. One of the first and second planar surfaces 220, 222 and the two seating surfaces 258, 260 are used to provide three-point contact when the cutting insert 200 is in the mounted position. In FIG. 15, the minor cutting edge 238 is essentially situated in the plane of the paper, while the adjacent minor cutting edge 140 extends transversely to the plane of the paper. The angled chamfer 214a being formed at the cutting corner 214 results in the minor cutting edge 240 being situated at a higher elevation by a distance 268 with respect to the minor cutting edge 238. As a result, the major cutting edge 230 and the minor cutting edge 238 are the active cutting edges, while the adjacent minor cutting edge 240. The major cutting edge 230 and the minor cutting edge 238 are capable of producing a ninety (90) shoulder cut in the workpiece 172.

Figure 16:
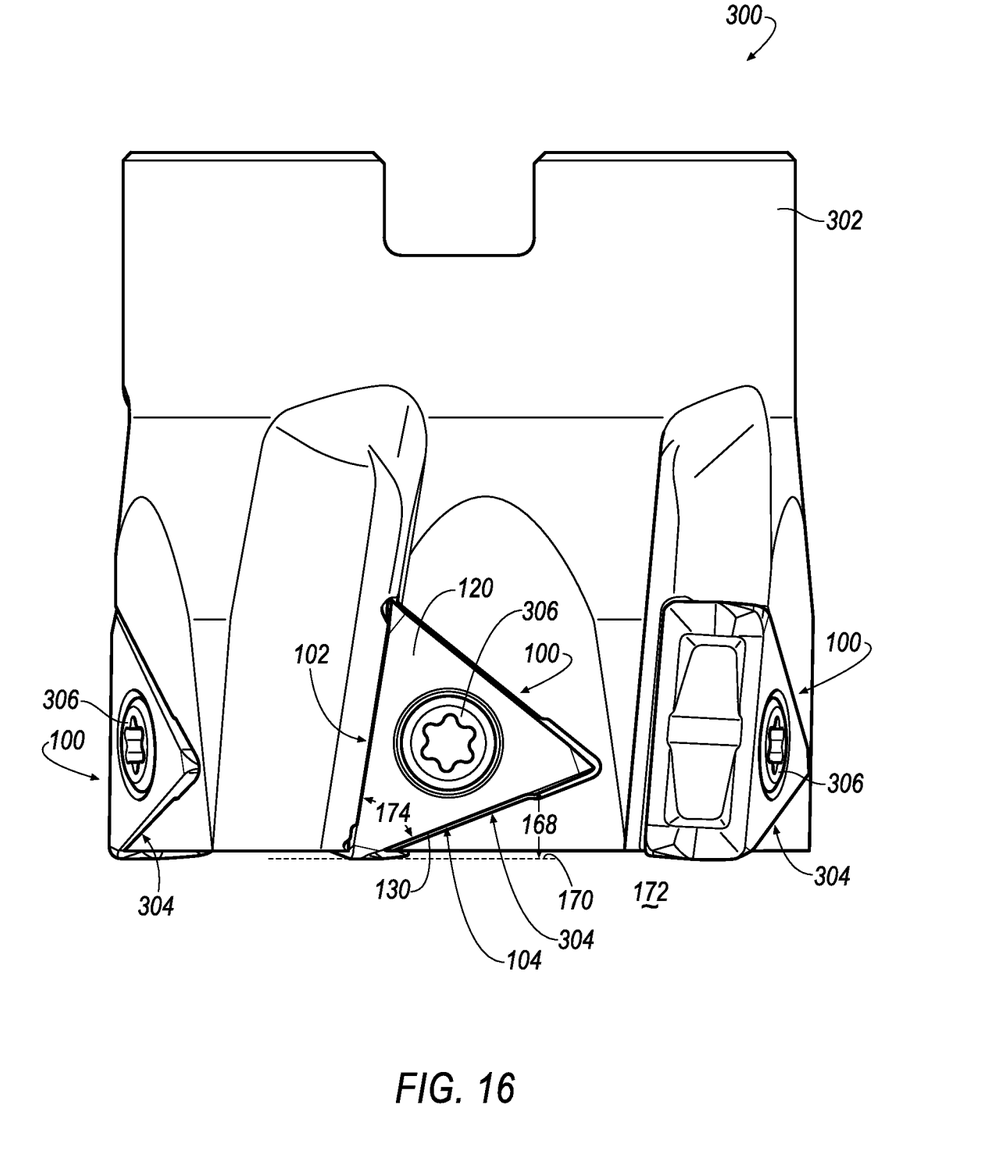
FIG. 16 shows a cutting tool, such as a milling tool provided with cutting inserts according to the invention.

Referring now to FIG. 16, a cutting tool 300, such as a milling tool, is shown according to an embodiment of the invention. The milling tool 300 has a number of cutting inserts 10, 100 or 200 tangentially mounted thereon. As shown in FIG. 16, for example, the milling tool 300 has a number of cutting inserts 100 tangentially mounted thereon, i.e., the cutting inserts 100 have their mounting holes 124 and central axis 125 extending in a substantially radial direction. As shown in FIG. 16, the milling tool 300 rotates in a clockwise direction.

The milling tool 300 includes a milling body 302 with a number of insert seats, shown generally at 304. Each cutting insert 100 is mounted in a respective insert seat 304 by means of a mounting screw 306. As is seen in FIG. 16, the active major cutting edge 130 forms a second clearance angle 168 with the surface 172 that is machined in the workpiece 170. This second clearance angle 168 is in the range of about fifteen (15) degrees to about twenty-five (25) degrees, preferably about twenty (20) degrees. As shown in FIG. 16, the cutting insert 10, 100, 200 of the invention has a wedge angle 174 between the side 104 and the side 102 of approximately sixty (60) degrees, which means that the cutting insert 10, 100, 200 has a true triangular shape, rather than a trigon shape.

As described above, the angled support surfaces 58, 60, 158, 160, 258, 260 and the planar surfaces 26, 120, 122, 220, 222 provide three-point contact when the insert 10, 100, 200 is mounted in the insert seat 304. As a result, the cutting insert 10, 100, 200 obtains exceptional seating stability when mounted in the milling body 302. In addition, the triangular basic shape of the cutting insert 10, 100, 200 provides a higher depth of cut and more material being removed from the surface 170 of the workpiece 172 than conventional trigon-shaped cutting inserts. In addition, the cutting insert 10 is capable of performing ramping operations. Further, the cutting insert 200 is capable of operating in either left hand or right hand cutter bodies.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. An indexable cutting insert having a triangular shape, comprising:
    three sides and three cutting corners at intersections of the sides, the three cutting corners formed with a nose radius;
    a first planar surface connecting the three sides and a second planar surface parallel to the first surface and also connecting the three sides, one of the first and second planar surfaces acting as a seating surface when the cutting insert is mounted in an insert seat of a milling body;
    a mounting hole located centrally in the cutting insert, the mounting hole penetrating both the first and second planar surfaces and having a central axis;
    three major cutting edges formed at an intersection between a respective side and the first planar surface and extending an entire length, L, of the respective side;
    three minor cutting edges formed at an intersection between one side and an adjacent side, each minor cutting edge extending from a respective cutting corner toward the second planar surface; and
    three ramp cutting edges formed at an intersection between one side and an adjacent side, each ramp cutting edge extending from a respective minor cutting edge to the second planar surface.

2. The cutting insert according to claim 1, wherein each minor cutting edge extends from the respective cutting corner for approximately one-half a thickness, T, of the cutting insert.

3. The cutting insert according to claim 1, wherein each ramp cutting edge is formed at an angle with respect to the respective minor cutting edge.

4. The cutting insert according to claim 1, wherein each ramp cutting edge extend from the respective minor cutting edge for approximately one-half the thickness, T, of the cutting insert to the second planar surface.

5. The cutting insert according to claim 1, wherein each ramp cutting edge is formed by an angled chamfer formed in a respective side that extends from the second planar surface.

6. The cutting insert according to claim 1, wherein each side includes a pair of recesses separated by a connection portion.

7. The cutting insert according to claim 6, wherein each recess has a seating surface.

8. The cutting insert according to claim 7, wherein the seating surface is formed at an angle with respect a plane parallel to the connection portion.

9. The cutting insert according to claim 7, wherein the seating surface is formed at an angle with respect to a plane parallel to the major cutting edges.

10. The cutting insert according to claim 1, wherein the cutting insert has a wedge angle of sixty degrees.

11. The cutting insert according to claim 1, wherein the cutting insert has six cutting corners at intersections of the sides, each cutting corner formed with a nose radius.

12. The cutting insert according to claim 11, wherein the cutting insert has six major cutting edges formed at an intersection between a respective side and the first and second planar surfaces.

13. The cutting insert according to claim 12, wherein the cutting insert has six minor cutting edges formed at an intersection between one side and an adjacent side.

14. The cutting insert according to claim 13, wherein the nose radius provides a clearance angle between an inactive minor cutting edge and a surface of a workpiece.

15. A milling tool comprising a milling body having a plurality of insert seats, wherein each insert seat is configured to receive a cutting insert according to claim 1 in such a way that the cutting insert is tangentially mounted in the milling body.

16. The milling tool according to claim 15, wherein the cutting insert has a second clearance angle with respect to a surface of a workpiece.

17. The milling tool according to claim 16, wherein the second clearance angle is in the range between fifteen degrees and twenty-five degrees.

18. An indexable cutting insert having a triangular shape, comprising:
    three sides and six cutting corners at intersections of the sides, each cutting corner formed with an angled chamfer;
    a first planar surface connecting the three sides and a second planar surface parallel to the first surface and also connecting the three sides, wherein both of the first and second planar surfaces act as a seating surface when the cutting insert is mounted in an insert seat of a milling body;

a mounting hole located centrally in the cutting insert, the mounting hole penetrating both the first and second planar surfaces and having a central axis; and six major right-handed cutting edges and six major left-handed cutting edges formed at an intersection between a respective side and the first and second planar surfaces, wherein each of the major right-handed cutting edges and each of the major left-handed cutting edges extend from a respective cutting corner toward another cutting corner for approximately one-half the length, L, of the respective side.

\* \* \* \* \*